(12) United States Patent
Lin et al.

(10) Patent No.: US 8,194,146 B2
(45) Date of Patent: Jun. 5, 2012

(54) APPARATUSES FOR CAPTURING AND STORING REAL-TIME IMAGES

(75) Inventors: Chang-Fu Lin, Hsinchu (TW);
Shu-Wen Teng, Taipei (TW);
Cheng-Che Chen, Taipei County (TW);
Wei Cheng Gu, Hsinchu (TW);
Ching-Chao Yang, Hsinchu (TW); Shih Tang Lin, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 751 days.

(21) Appl. No.: 12/191,547

(22) Filed: Aug. 14, 2008

(65) Prior Publication Data
US 2009/0179997 A1 Jul. 16, 2009

Related U.S. Application Data

(60) Provisional application No. 61/020,414, filed on Jan. 11, 2008.

(51) Int. Cl.
*H04N 5/228* (2006.01)

(52) U.S. Cl. .................................. 348/222.1; 348/312

(58) Field of Classification Search .............. 348/222.1, 348/510, 512, 526, 207.1, 312
See application file for complete search history.

(56) References Cited

U.S. PATENT DOCUMENTS

| 5,550,586 | A | * | 8/1996 | Kudo et al. ............... 348/222.1 |
| 6,664,970 | B1 | | 12/2003 | Matsushita |
| 7,050,197 | B1 | | 5/2006 | Szumla et al. |
| 7,174,406 | B1 | | 2/2007 | Abdallah et al. |
| 2002/0171657 | A1 | | 11/2002 | Lavelle et al. |
| 2003/0107656 | A1 | | 6/2003 | Ito et al. |
| 2003/0107669 | A1 | | 6/2003 | Ito et al. |
| 2003/0222998 | A1 | | 12/2003 | Yamauchi et al. |
| 2004/0119844 | A1 | | 6/2004 | Aldrich et al. |
| 2004/0125386 | A1 | | 7/2004 | Eom et al. |
| 2005/0285961 | A1 | * | 12/2005 | Kokubo et al. ............... 348/312 |
| 2006/0181547 | A1 | | 8/2006 | Loo |
| 2006/0182149 | A1 | | 8/2006 | Ramsdale |
| 2006/0182411 | A1 | | 8/2006 | Loo |
| 2006/0184987 | A1 | | 8/2006 | Allen et al. |
| 2007/0233928 | A1 | | 10/2007 | Gough |
| 2008/0018742 | A1 | * | 1/2008 | Hatano et al. ............. 348/207.1 |
| 2008/0068390 | A1 | | 3/2008 | Ishii et al. |
| 2009/0125663 | A1 | | 5/2009 | Schoegler |

FOREIGN PATENT DOCUMENTS

CN 1525759 A 9/2004

(Continued)

OTHER PUBLICATIONS

English abstract of DE102005026436A1; pub. Dec. 14, 2006.
English abstract of CN1525759A; pub. Sep. 1, 2004.
English language translation of abstract of CN 1878278 (published Dec. 13, 2006).

(Continued)

*Primary Examiner* — Nelson D. Hernández Hernández
(74) *Attorney, Agent, or Firm* — Thomas|Kayden

(57) ABSTRACT

An apparatus for capturing and storing real-time images is provided. A camera module records frames corresponding to sensed light, outputs pixel data of the frames on a data bus, and generates synchronization control signals to control the synchronized transmission of the frames. An interrupt controller receives the synchronization control signals and correspondingly generates interrupt signals. A processing unit receives the interrupt signals, fetches the pixel data of the frames on the data bus according to at least one of the interrupt signals, and stores the fetched pixel data in a memory device.

9 Claims, 14 Drawing Sheets

FOREIGN PATENT DOCUMENTS

| | | |
|---|---|---|
| CN | 1878278 | 12/2006 |
| CN | 201044473 | 4/2008 |
| DE | 102005026436 A1 | 12/2006 |
| WO | WO 99/13637 | 3/1999 |

OTHER PUBLICATIONS

English language translation of abstract of CN 201044473 (published Apr. 2, 2008).

* cited by examiner

APPARATUSES FOR CAPTURING AND STORING REAL-TIME IMAGES

CROSS REFERENCE TO RELATED APPLICATIONS

This application claims the benefit of U.S. Provisional Application No. 61/020,414, filed Jan. 11, 2008 and entitled "Systems and Methods for Control Signal and Data Transmissions between Various Types of Electronic Modules". The entire contents of which are hereby incorporated by reference.

BACKGROUND OF THE INVENTION

1. Field of the Invention

The invention relates to apparatuses for capturing and storing real-time images, and in particular relates to apparatuses for capturing and storing real-time images without extra hardware costs.

2. Description of the Related Art

In the recent years, more and more electrical devices, such as mobile phones, personal digital assistants (PDA), personal computers or others, are being equipped with camera modules for capturing real-time pictures and video frames. The camera mounted in the electrical devices is a commonly used camera, which is operated on the general principle basis for operating cameras. Specifically, the camera for the electrical devices has an image capture device mounted therein. In the image capture device, there is an image sensor mounted for receiving light from an external light source to recognize the received light as an image.

In order to capture real-time image data sensed by the camera module without data lost, there are several synchronization control signals used for controlling the transmission of the sensed image data. FIG. 1 shows exemplary waveforms of the synchronization control signals. As shown in FIG. 1, the Data bus is responsible for carrying pixel data of frames. The synchronization control signal $S_{Vsync}$ is responsible for indicating the beginning of a frame transmission (or the frame changes). The synchronization control signal $S_{Href}$ is responsible for indicating that the signal being carried on the Data bus is actual pixel data of a frame line. Typically, when the signal on the Data bus is actual pixel data, synchronization control signal $S_{Href}$ is pulled high. On the other hand, when the signal on the Data bus is blanking data, synchronization control signal $S_{Href}$ is pulled low. The synchronization control signal pixel clock $S_{Pixel\_Clk}$ is utilized to synchronize the pixel data transmissions. After detecting a start of a frame via the synchronization control signal $S_{Vsync}$, a receiver begins receiving pixel data of the frame. For example, the receiver captures pixel data on the data bus at the rising or falling edges of the pixel clock $S_{Pixel\_Clk}$ when the control signal $S_{Href}$ is at an active-high.

BRIEF SUMMARY OF THE INVENTION

Apparatuses for capturing and storing a plurality of real-time images are provided. An exemplary embodiment of such an apparatus comprises a camera module, an interrupt controller and a processing unit. The camera module records frames corresponding to sensed light via a sensor array, outputs the pixel data of frames on a data bus, and generates synchronization control signals to control the synchronized transmission of the frames. The interrupt controller receives the synchronization control signals and correspondingly generates interrupt signals. The processing unit receives the interrupt signals, captures the pixel data of the frames on the data bus according to at least one of the interrupt signals, and stores the fetched pixel data in a memory device.

Another exemplary embodiment of an apparatus for capturing and storing a plurality of real-time images comprises: a camera module as described above, an interrupt controller, a micro control unit and an image data controller. The interrupt controller receives the synchronization control signals and generates a plurality of interrupt signals, wherein the interrupt signals comprise a fetching interrupt signal generated according to at least one of the synchronization control signals. The micro control unit generates a frequency configuration indication signal and generates a fetching indication signal according to the fetching interrupt signal. The image data controller is coupled to the data bus and operates in a first state and a second state, wherein when the image data controller operates in the first state, the image data controller configures a data fetching frequency to be equal to a frequency of a pixel clock synchronizing pixel data transmission according to the frequency configuration indication signal, fetches the pixel data on the data bus with the data fetching frequency according to the fetching indication signal, stores the fetched pixel data in a memory device, and outputs a fetching completion signal to the interrupt controller after fetching of the pixel data of one of the frames is completed.

Another exemplary embodiment of an apparatus for capturing and storing a plurality of real-time images comprises a camera module as described above, an interrupt controller, a micro control unit, an event handler and a dynamic memory access (DMA) controller. The interrupt controller receives the synchronization control signals and generates interrupt signals, wherein the interrupt signals comprise a fetching interrupt signal generated according to at least one of the synchronization control signals to trigger an interrupt handler corresponding thereto. The micro control unit generates a fetching indication signal according to the fetching interrupt signal when executing the interrupt handler. The event handler receives a horizontal synchronization signal indicating that signals being carried on the data bus is actual pixel data of a frame line and a pixel clock synchronizing each pixel data transmission and generates a data fetching event according to the horizontal synchronization signal and the pixel clock after receiving the fetching indication signal. The DMA controller moves the pixel data on the data bus to a memory device according to the data fetching event.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
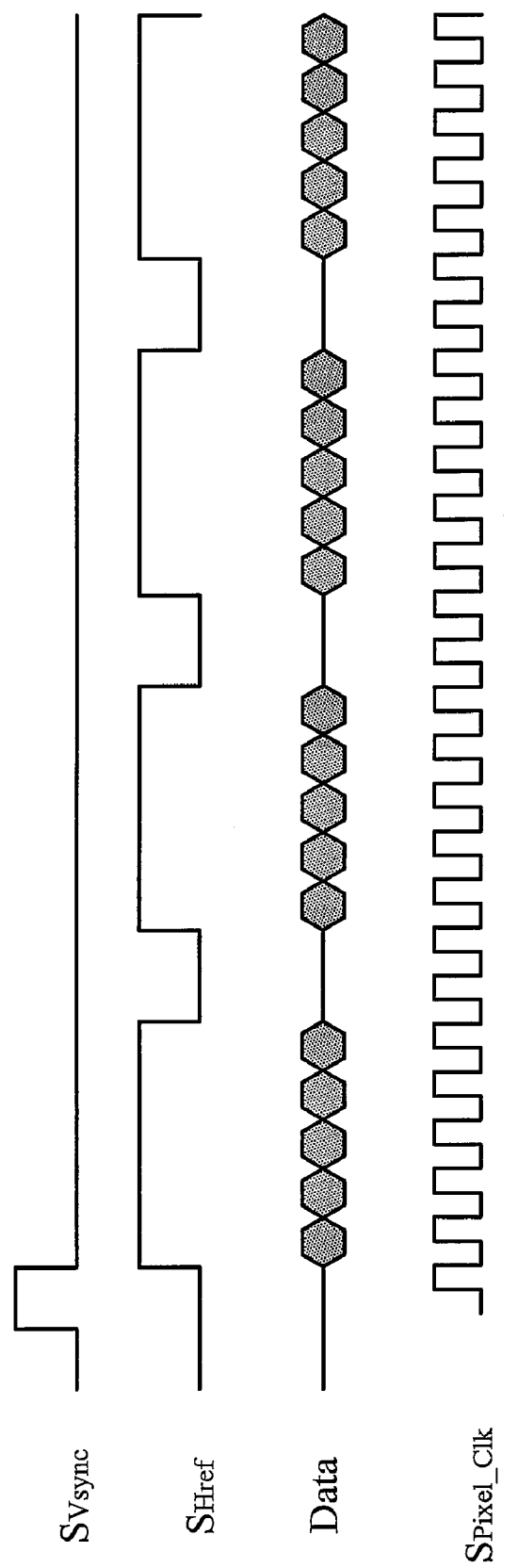
FIG. 1 shows the synchronization control signals generated by a camera module.

According to embodiments of the invention, the synchronization control signals generated by the camera module as shown in FIG. 1 are utilized to trigger and fetch data from the camera module via the I/O data pads, wherein the data may be pixel data generated by the camera module. The data may be fetched via a memory interface. According to the embodiments of the invention, the fetched pixel data may further be written to a memory device. The data fetching may be triggered when an interrupt signal to a micro control unit (MCU) is detected. The interrupt causes the MCU to save its state of execution and begin execution of an interrupt handler (also referred to as an interrupt service routine, ISR). The data fetching may be implemented by sending control signals (or acknowledge signals) to a direct memory access (DMA) controller. A data bus of a master mode camera module may be connected to a liquid crystal display (LCD) interface of an LCD module, an external memory interface (EMI), or others having I/O data pads with 8-bits or more.

There are two types of camera modules that can be installed in an electronic device, one is a master mode camera module, and the other is a slave mode camera module. The difference between the master and slave mode camera modules is the generation of $S_{Vsync}$ and $S_{Href}$ signals. The master mode camera module actively generates $S_{Vsync}$ and $S_{Href}$ signals. The slave mode camera module receives $S_{Vsync}$ and $S_{Href}$ signals from a receiver and transmits data on the Data bus according to the received $S_{Vsync}$ and $S_{Href}$ signals. For the master mode camera module, the camera module does not wait for acknowledgement from a receiver, and the receiver must capture real time pixel data from the master mode camera module, otherwise, pixel data would be lost.

Figure 2:
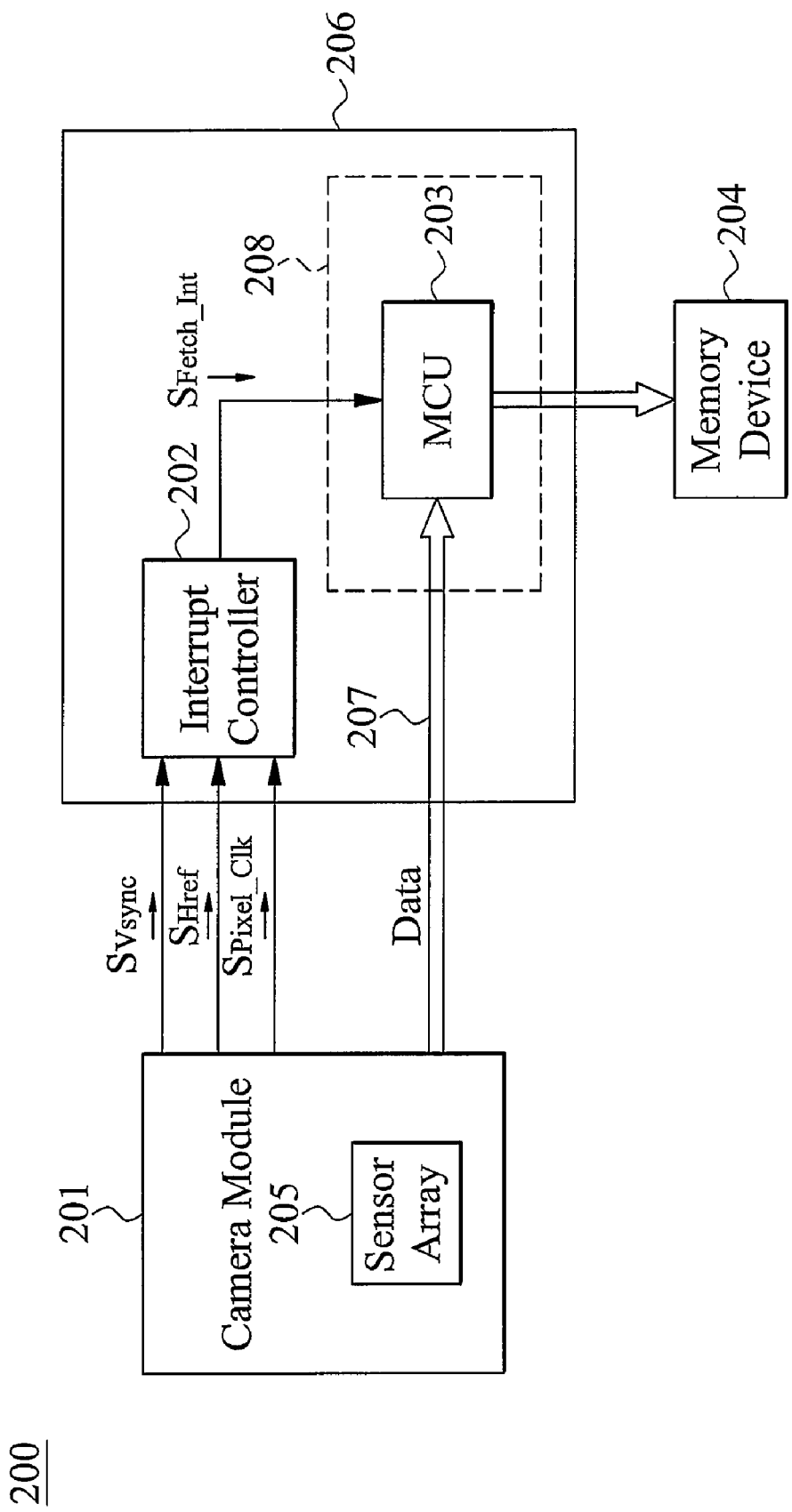
FIG. 2 shows a block diagram of an apparatus for capturing and storing a plurality of real-time images according to a first embodiment of the invention.

FIG. 2 shows a block diagram of an apparatus 200 for capturing and storing a plurality of real-time images according to a first embodiment of the invention. As shown in FIG. 2, the apparatus 200 comprises a master mode camera module 201 (hereinafter called camera module), a memory device 204 and a chip 206, wherein the memory device 204 may be a frame buffer, an external memory, and so on. The camera module 201 may contain lens, a sensor array and an analog-to-digital converter (ADC). In some embodiments, the camera module 201 may further contain an image signal processor (ISP). The camera module records real-time color images as intensities of red, green and blue of a plurality of frames by sensing the light from an external light source via the sensor array 205 and recognizes the received light as the intensities of the frames, wherein the intensities are stored as variable (analog) charges on a charge-coupled device (CCD) or complementary metal-oxide-semiconductor (CMOS) sensor array. The charges are converted into digital data by the ADC. The ISP may adjust contrast and detail and compress the digital data for subsequent display and storage. The camera module 201 outputs the frames on a data bus 207 after capturing the images and generates a plurality of synchronization control signals to control the synchronized transmission of the frames, wherein each frame comprises a plurality of frame lines and each frame line comprises a plurality of pixel data, and wherein the synchronization control signals comprise a vertical synchronization signal $S_{Vsync}$, a horizontal synchronization signal $S_{Href}$, and a pixel clock $S_{Pixel\_Clk}$ as shown in FIG. 1.

The chip 206 mainly contains an interrupt controller 202 and a processing unit 208. The interrupt controller 202 receives the synchronization control signals and correspondingly generating a plurality of interrupt signals. When receiving the interrupt signals, the processing unit 208 fetches the pixel data of the frames outputted by the camera module 201 on the data bus 207 via the I/O pads, and stores the fetched pixel data in the memory device 204. According to the embodiment of the invention, the processing unit 208 comprises a micro control unit (MCU) 203 and the interrupt controller 202 may receive the pixel clock $S_{Pixel\_Clk}$ from the camera module 201 and generates a fetching interrupt signal $S_{Fetch\_Int}$ to the MCU 203 at each rising or falling edge of the pixel clock. According to another embodiment of the invention, the interrupt controller 202 may receive the control signal $S_{Href}$ and pixel clock $S_{Pixel\_Clk}$ from the camera module and, when the $S_{Href}$ is at an active-high, the interrupt controller 202 generates a fetching interrupt signal $S_{Fetch\_Int}$ to the MCU 203 at each rising or falling edge of the pixel clock. As well known in the art, an interrupt signal is an asynchronous signal from hardware indicating the need for a change in software execution. The interrupt signal typically causes the MCU to save its state of execution via a context switch, and begin execution of an interrupt handler. The MCU, when executing program code (e.g. the interrupt handler or a software function, module, routine or the like called by the corresponding interrupt handler), fetches pixel data on the data bus 207 from the camera module via the I/O pads and stores the fetched pixel data in the memory device 204 upon receiving the fetching interrupt signal from the interrupt controller 202.

Figure 3:
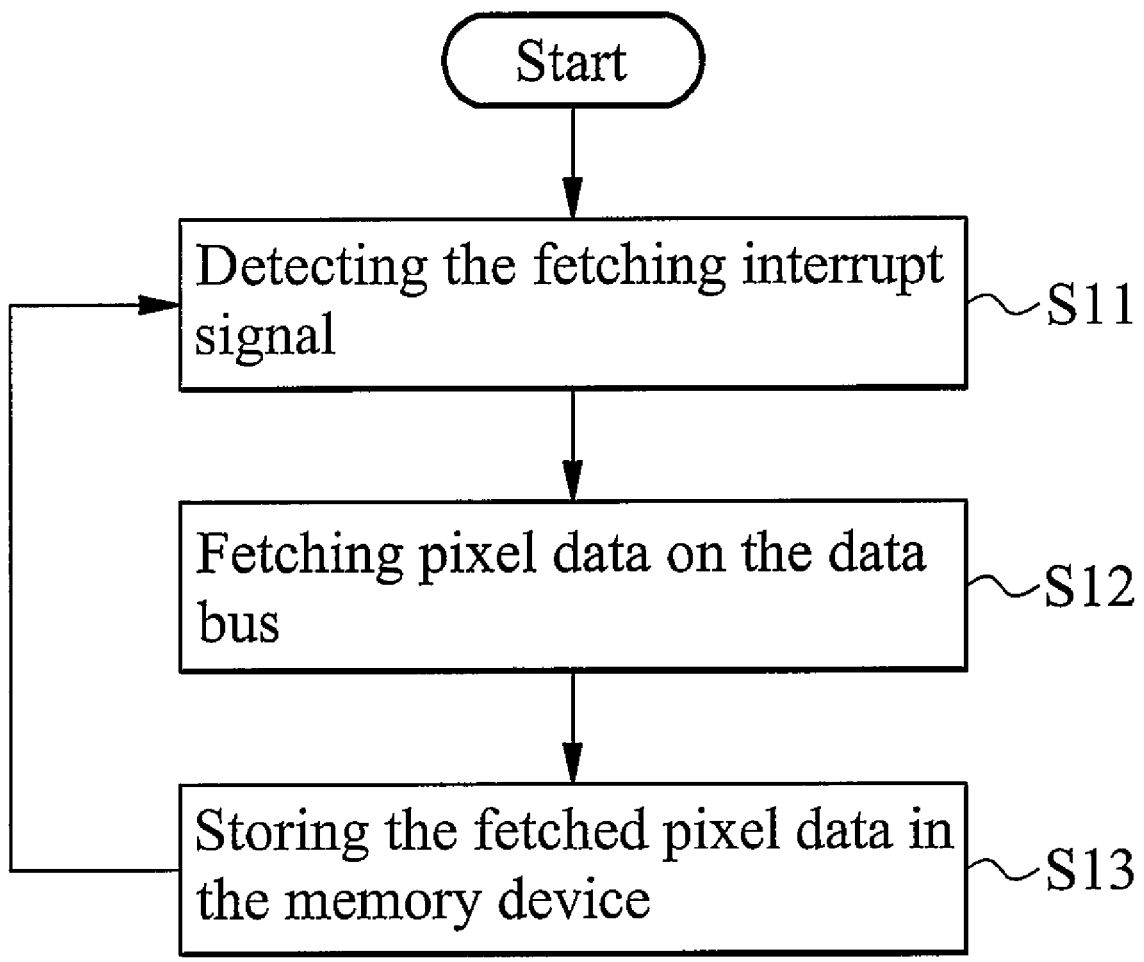
FIG. 3 shows a flowchart of the method performed by the MCU for capturing and storing real-time images according to the first embodiment of the invention.

FIG. 3 shows a flowchart of the method performed by the MCU 203 for capturing and storing real-time images according to the first embodiment of the invention. The MCU 203 continuously detects the fetching interrupt signal from the interrupt controller 202 (step S11). Upon receiving the fetching interrupt signal from the interrupt controller, the MCU 203 fetches pixel data on the data bus 207 via the I/O pads, which is generated by the camera module 201 (step S12) and stores the fetched pixel data in the memory device 204 (step S13) for subsequent display on a preview window, or storage.

Figure 4:
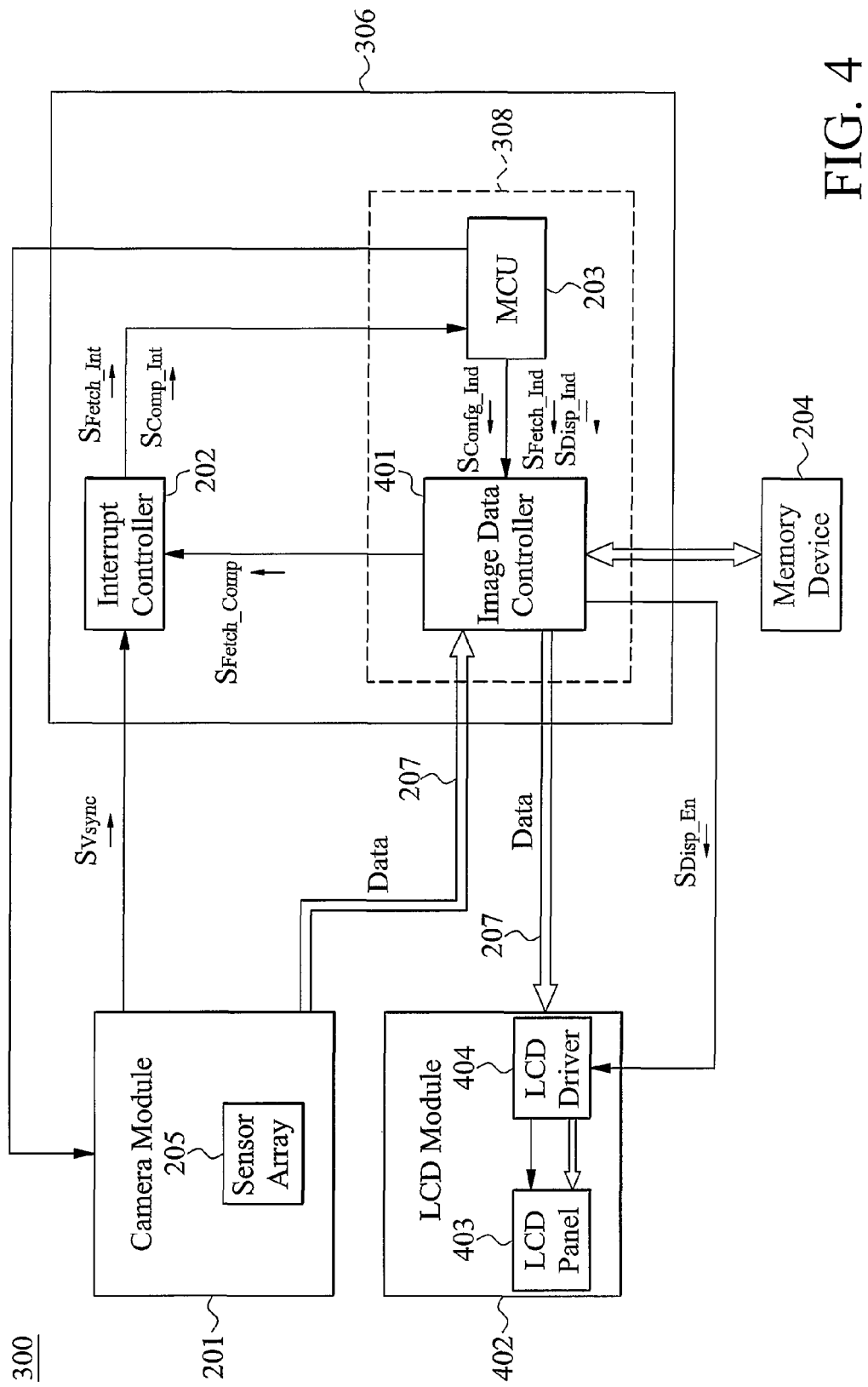
FIG. 4 shows a block diagram of an apparatus 300 for capturing and storing a plurality of real-time images according to a second embodiment of the invention.
Figure 5:
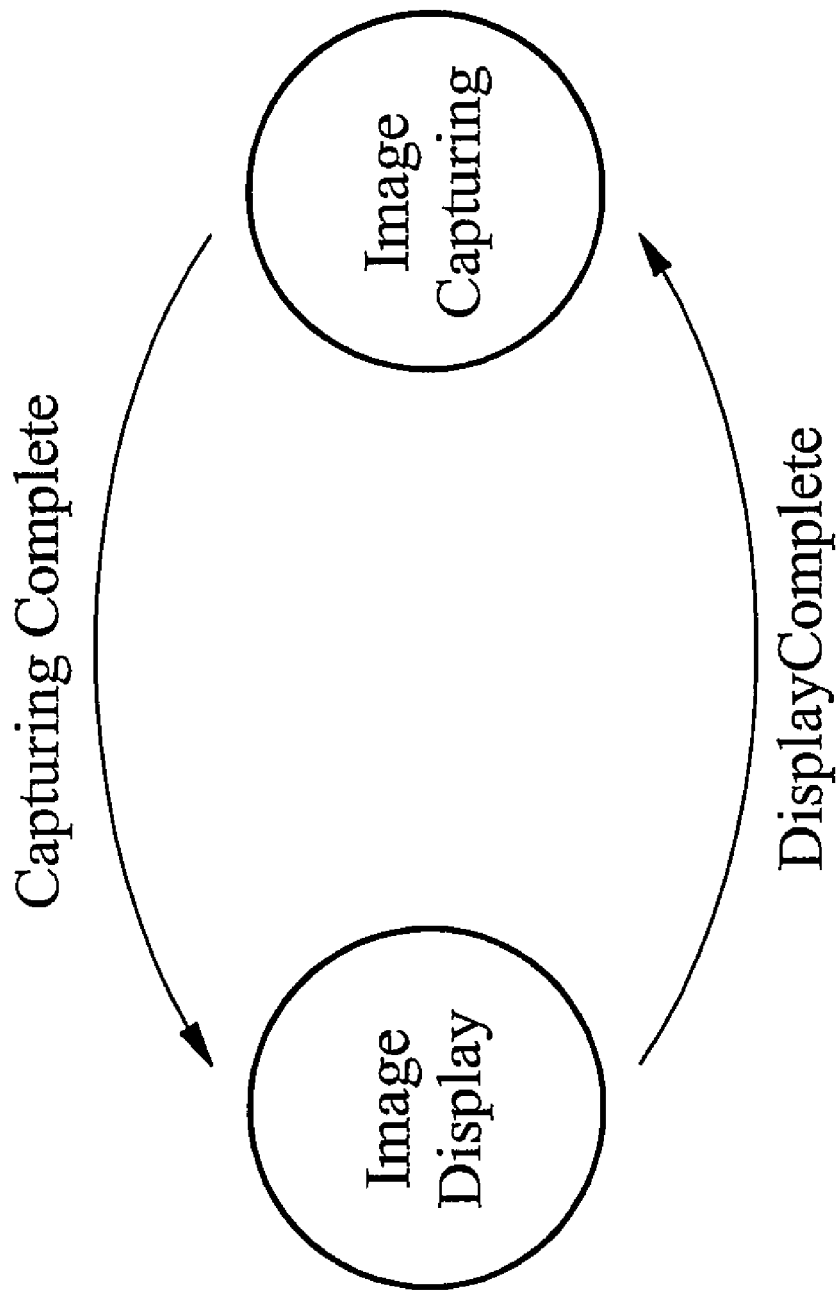
FIG. 5 shows an exemplary state machine operated by the image data controller.

FIG. 4 shows a block diagram of an apparatus 300 for capturing and storing a plurality of real-time images according to a second embodiment of the invention. As shown in FIG. 4, the apparatus 300 comprises a camera module 201, an LCD module 402, a memory device 204 and a chip 306. The chip 306 comprises an interrupt controller 202, and a processing unit 308, wherein the processing unit 308 further comprises an MCU 203 and an image data controller 401. Details of the camera module will be omitted here for the sake of brevity, as reference may be made to the prior descriptions of FIG. 2. The LCD module 402 may contain an LCD panel 403 displaying the pixel data of the frames and an LCD driver 404 fetching the pixel data on the data bus 207 according to a display enabling signal $S_{Disp\_En}$ and driving the LCD panel 403 to display the fetched pixel data. According to the embodiment of the invention, the camera module 201 and the LCD module 402 may share the same data bus 207 to transmit or receive pixel data to or from the image data controller 401. According to another embodiment of the invention, the camera module 201 and the LCD module 402 may use two different data buses to transmit pixel data to and receive pixel data from the image data controller 401. The image data controller 401 may be a controller capable of periodically fetching data with a data fetching frequency. For example, the image data controller 401 may be an LCD controller and thus, the camera module 201 and the LCD module 402 may share the same LCD controller. For coordinating usage of the data bus 207 between the camera module 201 and the LCD module 402, the camera and LCD modules may be alternately driven by the MCU 203. An exemplary state machine containing two states such as image capturing and image display is illustrated in FIG. 5.

In the image capturing state, with reference also to FIG. 4, the MCU 203 sets the camera module 201 to active so as to enable the camera module to connect (re-connect) to the data bus 207. The MCU further generates a frequency configuration indication signal $S_{Config\_Ind}$ to direct the image data controller 401 to configure a data fetching frequency to be equal to a frequency of the pixel clock generated by the camera module 201. When the camera module 201 is activated, the interrupt controller 202 generates a fetching interrupt signal $S_{Fetch\_Int}$ to the MCU 203 upon receiving the vertical synchronization signal $S_{Vsync}$ indicating a transmission start of a frame from the camera module 201. Moreover, the camera module 201 then sequentially transmits all pixel data of the frame with a frequency of the pixel clock. When receiving the fetching interrupt signal $S_{Fetch\_Int}$, the MCU informs the image data controller 401 of a quantity of frame pixels and triggers the image data controller 401 to fetch pixel data on the data bus 207 via a fetching indication signal $S_{Fetch\_Ind}$. The image data controller 401 subsequently fetches pixel data with the configured data fetching frequency on the data bus 207 via the I/O pads and stores the fetched pixel data in the memory device 204. When the pixel data of one of the frames is completely captured, the image data controller 401 further outputs a fetching completion signal $S_{Fetch\_Comp}$ to the interrupt controller 202 and interrupt controller 202 further generates a capture completion interrupt signal $S_{Comp\_Int}$ to the MCU after receiving the fetching completion signal. After the MCU 203 receives the capture completion interrupt $S_{Comp\_Int}$, transition is made to an image display state. It is to be understood that in the image capturing state, the display enabling signal $S_{Disp\_En}$ is de-asserted (for example, pulled low for an active-high signal) so that the LCD module 402 may not capture the pixel data on the data bus 207.

Figure 6:
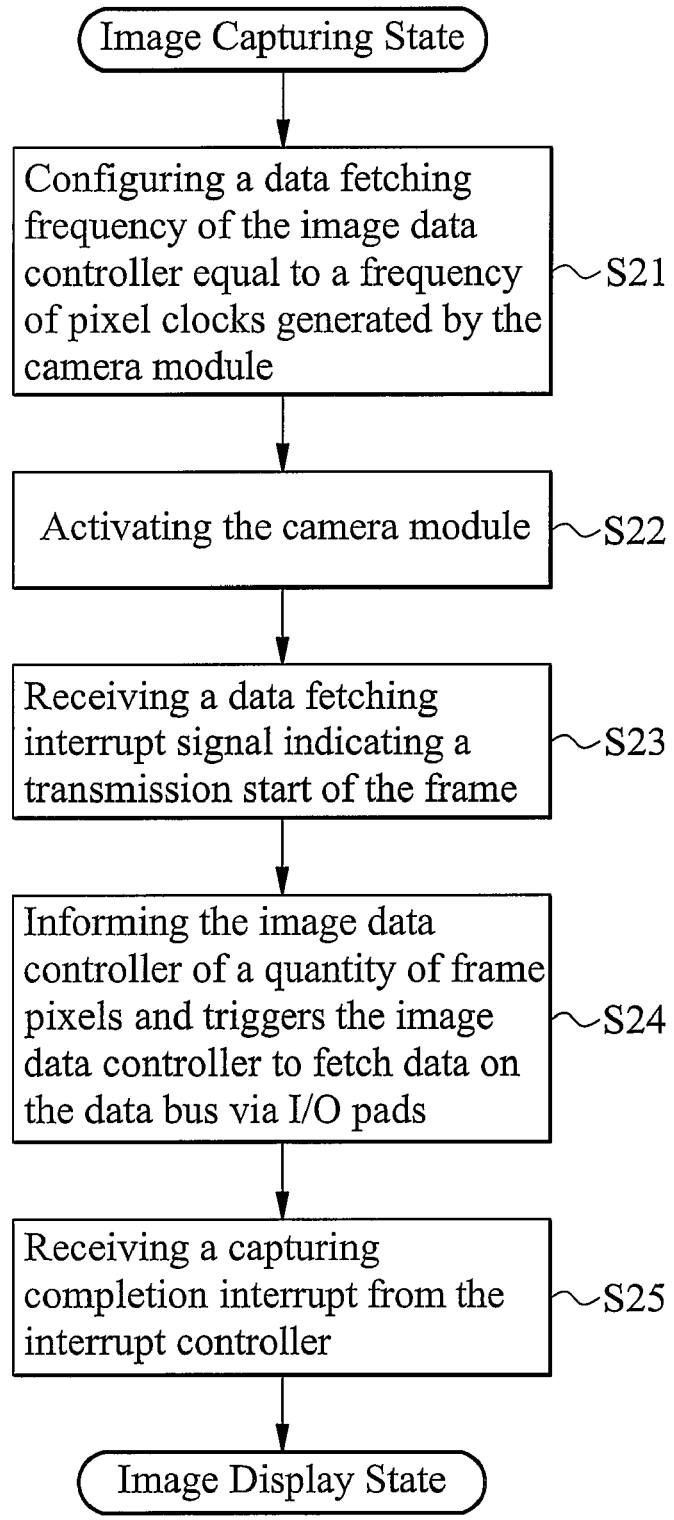
FIG. 6 shows a flowchart of the method performed by the MCU for capturing and storing real-time images during an image capturing state according to the second embodiment of the invention.

FIG. 6 shows a flowchart of the method performed by the MCU 203 for capturing and storing real-time images according to the second embodiment of the invention. The MCU 203, when executing program code for the image capturing state, starts to configure a data fetching frequency of the image data controller 401 to be equal to a frequency of pixel clock generated by the camera module 201 (Step S21). Next, the camera module is set to active (Step S22). Note that steps S21 and S22 may be performed when the MCU 203 executes a interrupt handler corresponding to a display completion interrupt signal or a software function, module, routine or the like called by the corresponding interrupt handler, where the generation of display completion interrupt signal is to be described as follows. It is to be understood, in some embodiments, that the configuration step may be implemented after setting the camera module to active. Next, as a vertical synchronization signal indicating a transmission start of a frame is received by the interrupt controller 202, the MCU 203 receives a fetching interrupt signal indicating a transmission start of the frame (Step S23), and subsequently informs the image data controller 401 of a quantity of frame pixels and triggers the image data controller 401 to fetch data on the data bus via the I/O pads in the configured data fetching frequency (Step S24). Note that steps S23 and S24 may be performed when the MCU 203 executes a interrupt handler corresponding to the fetching interrupt signal or a software function, module or routine, or the like called by the corresponding interrupt handler. Next, when the image data controller 401 completely fetches all pixel data of one of the frames and stores all pixel data in the memory device 204, the MCU 203 receives a capture completion interrupt signal from the interrupt controller 202 (Step S25).

In the image display state, with reference also to FIG. 4, the MCU 203 isolates the camera module 201 from the data bus 207 by setting the camera module 201 to enter a high impedance state (i.e. tri-state, set a terminal of the camera module connecting to the data bus to Hi-Z). The MCU 203 subsequently outputs a display indication signal $S_{Disp\_Ind}$ to trigger the image data controller 401 to retrieve pixel data of a frame from the memory device 204 and transmit the retrieved pixel data to the data bus 207. The image data controller 401 further asserts (for example, pulled high for an active-high signal) the display enabling signal $S_{Disp\_En}$ after receiving the display indication signal $S_{Disp\_Ind}$. Once the display enabling signal $S_{Disp\_En}$ is asserted, the LCD module 402 starts to fetch the pixel data on the data bus 207 and displays the fetched pixel data on the LCD panel 403. When completely transmitting the frame pixels, the image data controller 401 directs the interrupt controller to issue a display completion interrupt signal to the MCU 203. After the MCU 203 receives the display completion interrupt signal, transition is made to an image capturing state.

Figure 7:
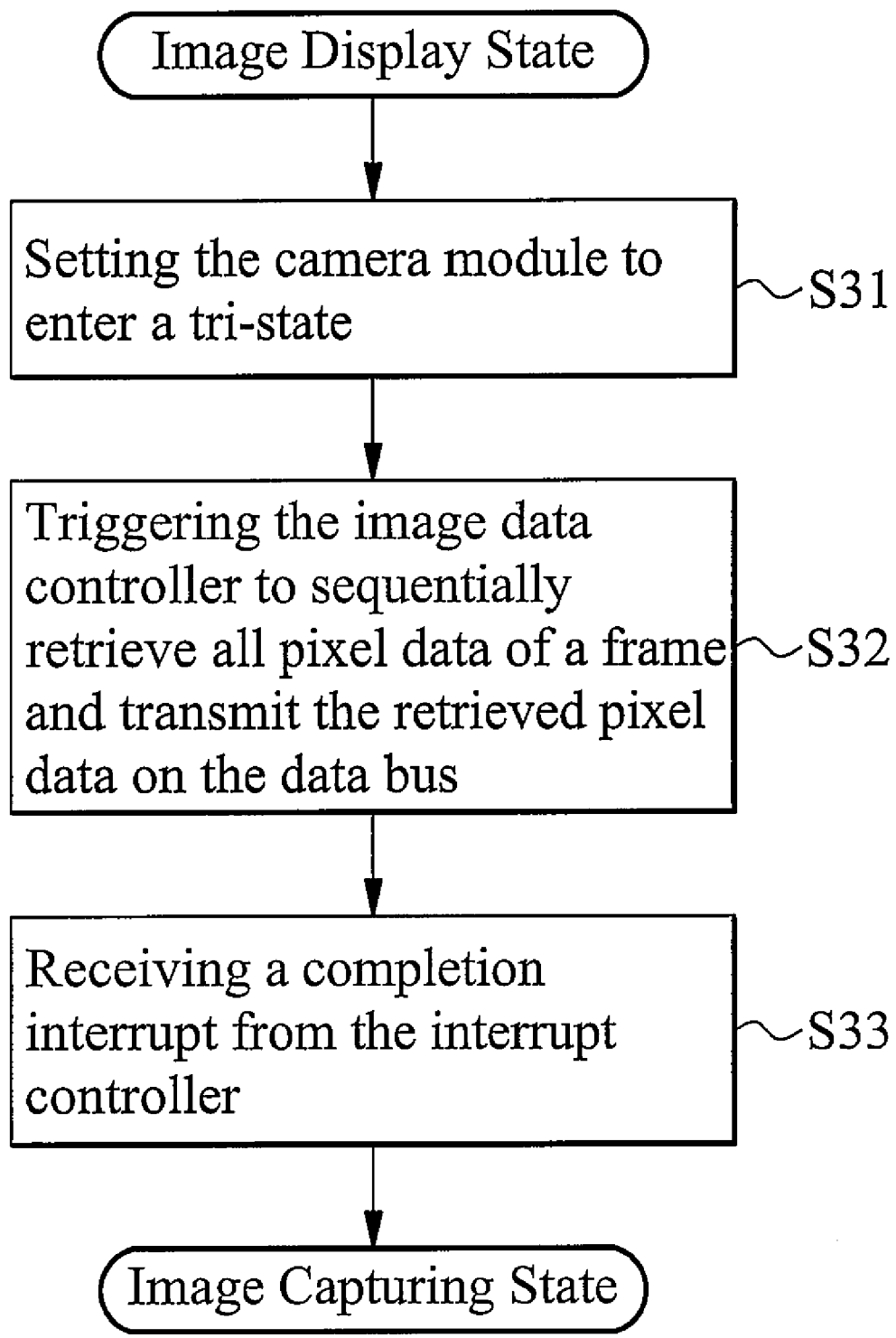
FIG. 7 shows a flowchart of the method performed by the MCU for capturing and storing real-time images during an image display state according to the second embodiment of the invention.

A flowchart illustrating a second embodiment of a method during an image display state, performed by the MCU, is shown in FIG. 7. The MCU 203, when executing program code for the image display state (e.g. a interrupt handler corresponding to the capture completion interrupt signal or a software function, module, routine or the like called by the corresponding interrupt handler), sets the camera module to enter a tri-state (Step S31), and triggers the image data controller 401 to sequentially retrieve all pixel data of a frame and transmit the retrieved pixel data on the data bus 207 (Step S32). The LCD module 402 sequentially fetches pixel data on the data bus 207 and displays the fetched pixel data on the LCD panel 403 thereof. Thereafter, when the image data controller 401 completes all operations, the MCU 203 receives a display completion interrupt signal from the interrupt controller 202 (Step S33).

Figure 8:
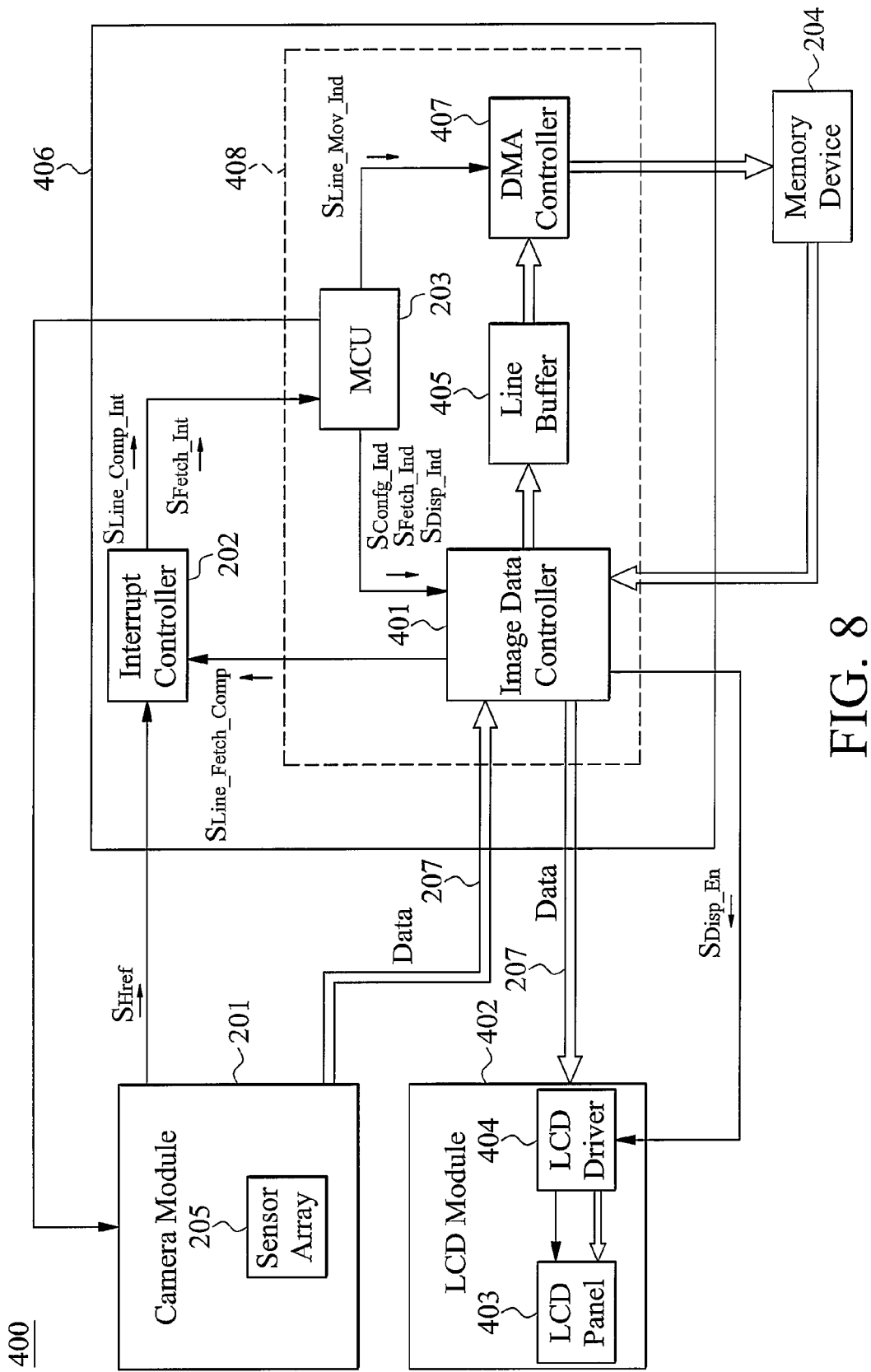
FIG. 8 shows a block diagram of an apparatus for capturing and storing a plurality of real-time images according to a third embodiment of the invention.

FIG. 8 shows a block diagram of an apparatus 400 for capturing and storing a plurality of real-time images according to a third embodiment of the invention. As shown in FIG. 8, the apparatus 400 comprises a camera module 201, an LCD module 402, a memory device 204 and a chip 406. The chip 406 comprises an interrupt controller 202, and a processing unit 408, wherein the processing unit 408 further comprises an MCU 203, an image data controller 401, a line buffer 405 and a direct memory access (DMA) controller 407. Details of the camera and LCD modules will be omitted here for the sake of brevity, as reference may be made to the prior descriptions of FIG. 4. The camera module 201 and the LCD module 402 may share the same data bus 207 to transmit or receive pixel data to or from the image data controller 401. Similar with the second embodiment of the system, the camera and LCD modules are alternately driven by the MCU.

In the image capturing state, with reference also to FIG. 8, the MCU 203 sets the camera module 201 to active so as to enable the camera module to connect (re-connect) to the data bus 207. The MCU 203 further generates a frequency configuration indication signal $S_{Config\_Ind}$ to direct the image data controller 401 to configure a data fetching frequency to be equal to a frequency of the pixel clock generated by the camera module 201. When the camera module 201 is activated, the interrupt controller 202 repeatedly detects the horizontal synchronization signal $S_{Href}$, which indicates that signals being carried on the data bus 207 are actual pixel data of a frame line from the camera module 201, and then, upon detection of the horizontal synchronization signal $S_{Href}$, generates a fetching interrupt signal $S_{Fetch\_Int}$ to the MCU 203. Moreover, the camera module 201 then sequentially transmits all pixel data of the frame with a frequency of the pixel clock. When receiving the fetching interrupt signal $S_{Fetch\_Int}$, the MCU 203 informs the image data controller 401 of a quantity of frame line pixels and triggers the image data controller 401 to fetch pixel data of a frame line on the data bus 207 via a fetching indication signal $S_{Fetch\_Ind}$. The image data controller 401 subsequently fetches pixel data with the configured data fetching frequency on the data bus 207 via I/O pads and stores the fetched pixel data in the line buffer 405. It is to be understood that in the image capturing state, the display enabling signal $S_{Disp\_En}$ is de-asserted.

When the pixel data of one of the frame lines is completely captured, the image data controller 401 further outputs a line fetching completion signal $S_{Line\_Fetch\_Comp}$ to the interrupt controller 202. The interrupt controller 202 generates a line fetching completion interrupt signal $S_{Line\_Comp\_Int}$ to the MCU 203 after receiving the fetching completion signal. After the MCU 203 receives the line fetching completion interrupt $S_{Line\_Comp\_Int}$, the MCU 203 triggers the DMA controller 407 to move pixel data from the line buffer 405 to the memory device 204 via a line data moving indication signal $S_{Line\_Mov\_Ind}$ and further determines whether the received line is the last line of the frame. If so, transition is made to an image display state, otherwise, the MCU 203 waits for another fetching interrupt signal $S_{Fetch\_Int}$ from the interrupt controller 202. Note that in some embodiments, the DMA controller may be omitted and the MCU 203 may directly move pixel data from the line buffer 405 to the memory device 204 after receiving the line fetching completion interrupt signal $S_{Line\_Comp\_Int}$. Also note that for those skilled in the art, subsequent processes following detection of a subsequent fetching interrupt signal from the interrupt controller 202 may be deduced based upon the previous descriptions.

Figure 9:
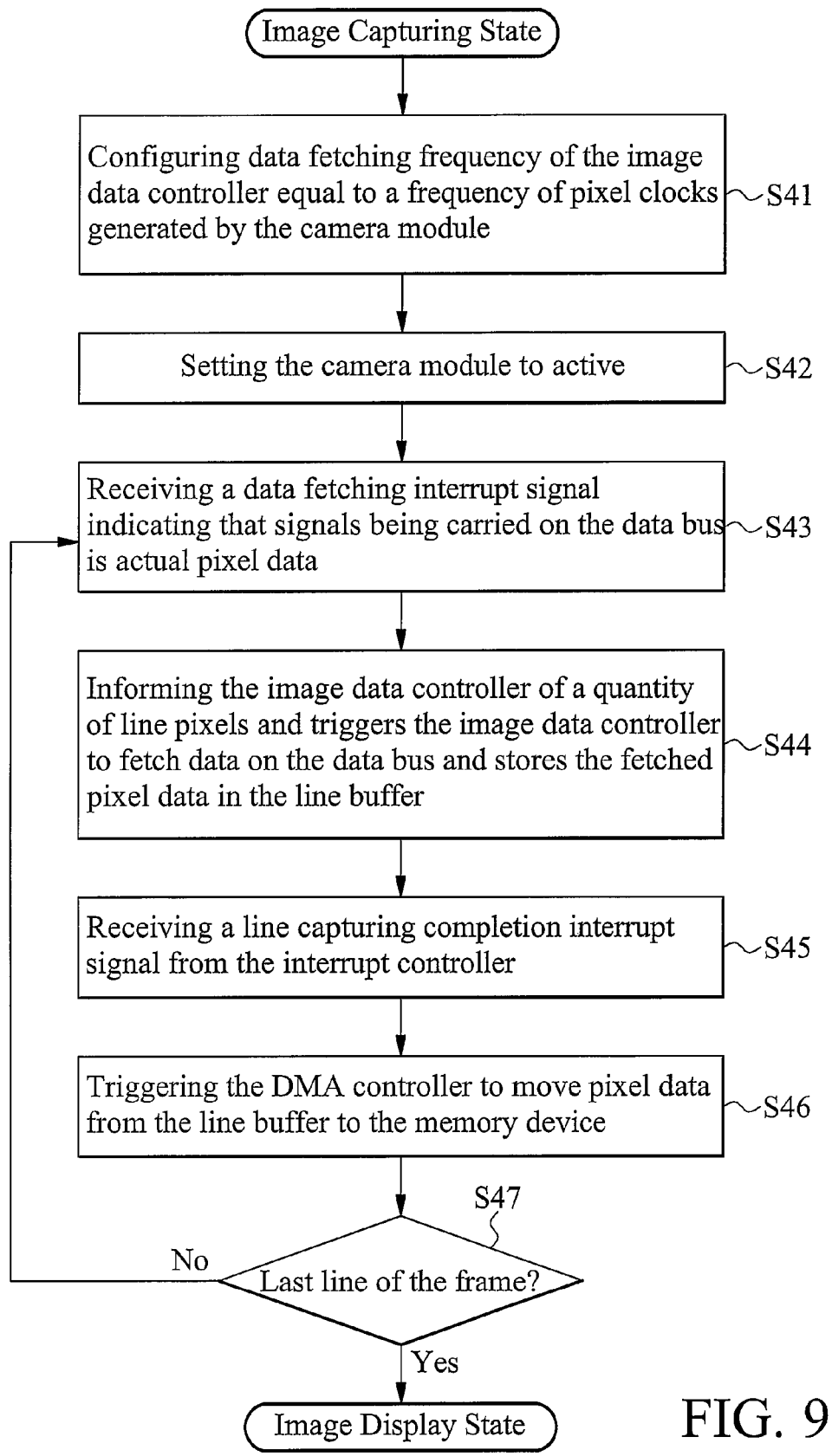
FIG. 9 shows a flowchart of the method performed by the MCU for capturing and storing real-time images during an image capturing state according to the third embodiment of the invention.

FIG. 9 shows a flowchart of the method performed by the MCU 203 for capturing and storing real-time images according to the third embodiment of the invention. The MCU 203, when executing program code for the image capturing state, starts to configure data fetching frequency of the image data controller 401 to be equal to a frequency of pixel clock generated by the camera module 201 (Step S41). The camera module 201 is set to active (Step S42). Note that steps S41 and S42 may be performed when the MCU 203 executes a interrupt handler corresponding to a display completion interrupt signal or a software function, module, routine or the like called by the corresponding interrupt handler. It is to be understood, in some embodiments, that the configuration step may be implemented after setting the camera module 201 to active. Next, as a horizontal synchronization signal indicating that signals being carried on the data bus is actual pixel data of a frame line is received by the interrupt controller 202, the MCU 203 receives a fetching interrupt signal indicating that signals being carried on the data bus is actual pixel data (Step S43), informs the image data controller 401 of a quantity of line pixels and triggers the image data controller 401 to fetch data on the data bus 207 and stores the fetched pixel data in the line buffer 405 (Step S44). When the image data controller 401 completely fetches all pixel data of the line and stores the fetched pixel data in the line buffer 405, the MCU 203 receives a line fetching completion interrupt signal from the interrupt controller 202 (Step S45). The MCU 203 subsequently trigger the DMA controller 407 to move pixel data from the line buffer 405 to the memory device 204 (Step S46), and determines whether the processed line is the last line of the frame (Step S47). If so, a transition is made to an image display state, otherwise, the MCU waits for another data fetching interrupt signal from the interrupt controller 202 (Step S43). Note that the loop containing steps S43 to S47 may be performed when the MCU 203 executes a interrupt handler corresponding to the fetching interrupt signal or a software function, module or routine, or the like called by the corresponding interrupt handler.

In the image display state, with reference also to FIG. 8, the MCU 203 sets the camera module 201 to enter a high impedance state (i.e. a tri-state, set a terminal of the camera module 201 connecting to the data bus 207 to Hi-Z) so as to isolate the camera module 201 from the data bus 207. The MCU 203 subsequently outputs a display indication signal $S_{Disp\_Ind}$ to trigger the image data controller 401 to retrieve and fetch pixel data of a frame from the memory device 204 and transmits the retrieved pixel data to the data bus 207. The image data controller 401 further asserts the display enabling signal $S_{Disp\_En}$ after receiving the display indication signal $S_{Disp\_Ind}$. Once the display enabling signal $S_{Disp\_En}$ is asserted, the LCD module 402 starts to fetch the pixel data on the data bus 207 and displays the fetched pixel data on the LCD panel 403. When frame pixels are completely transmitted, the image data controller 401 directs the interrupt controller 202 to issue a completion interrupt signal to the MCU 203. After the MCU 203 receives the completion interrupt, transition is made to an image capturing state.

Figure 10:
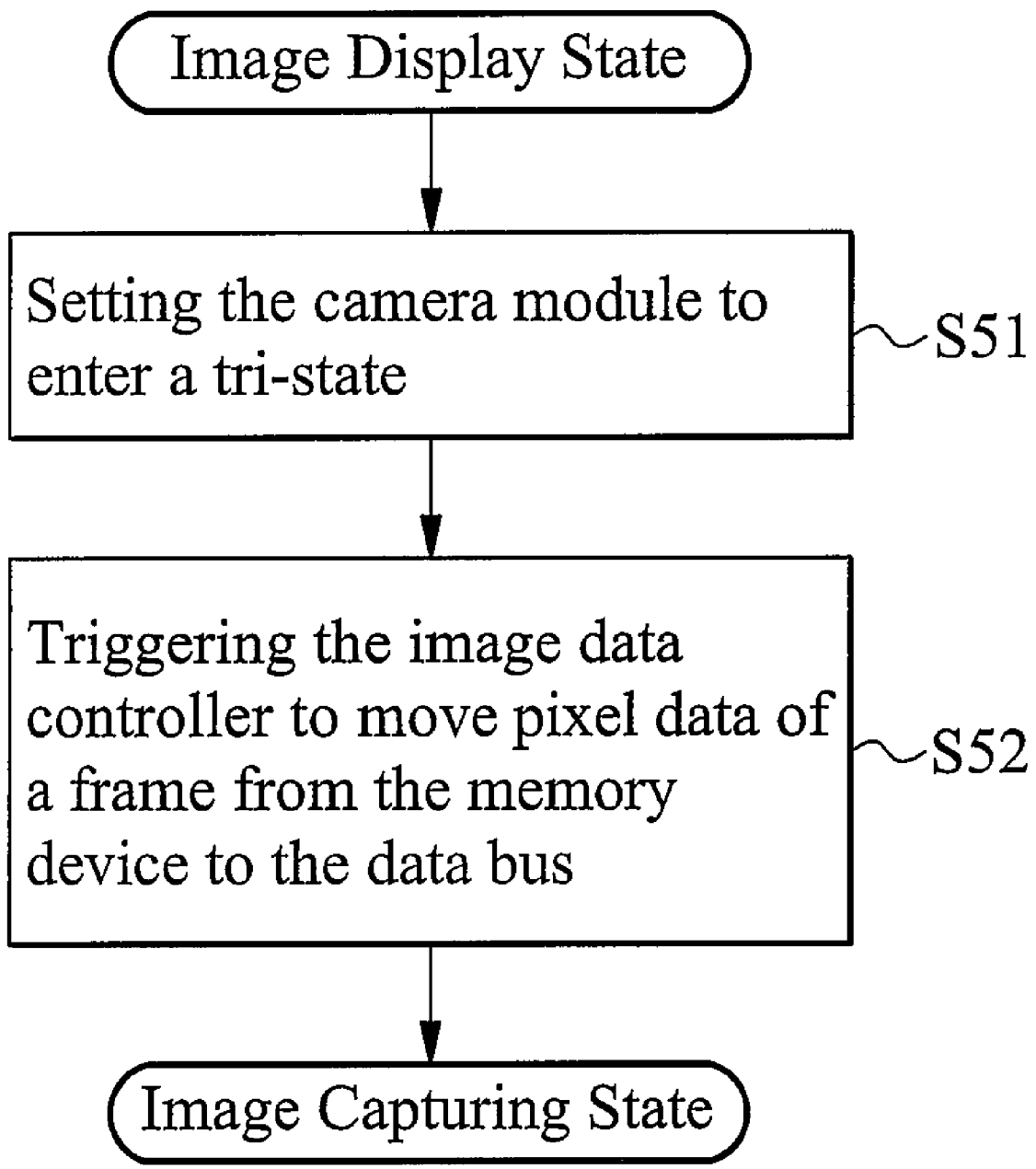
FIG. 10 shows a flowchart of the method performed by the MCU for capturing and storing real-time images during an image display state according to the third embodiment of the invention.

A flowchart illustrating the third embodiment of a method during an image display state, performed by the MCU, is shown in FIG. 10. The MCU, when executing program code for the image display state (e.g. a interrupt handler corresponding to a capture completion interrupt signal or a software function, module, routine or the like called by the corresponding interrupt handler), sets the camera module 201 to enter a tri-state (Step S51). Thereafter, the MCU 203 repeatedly triggers the image data controller 401 to move pixel data of a frame from the memory device 204 to the data bus 207 (Step S52). As a result, the LCD module 402 fetches pixel data on the data bus 207 and displays the fetched pixel data on the LCD panel 403 thereof. After displaying, transition is made to an image capturing state.

Figure 11:
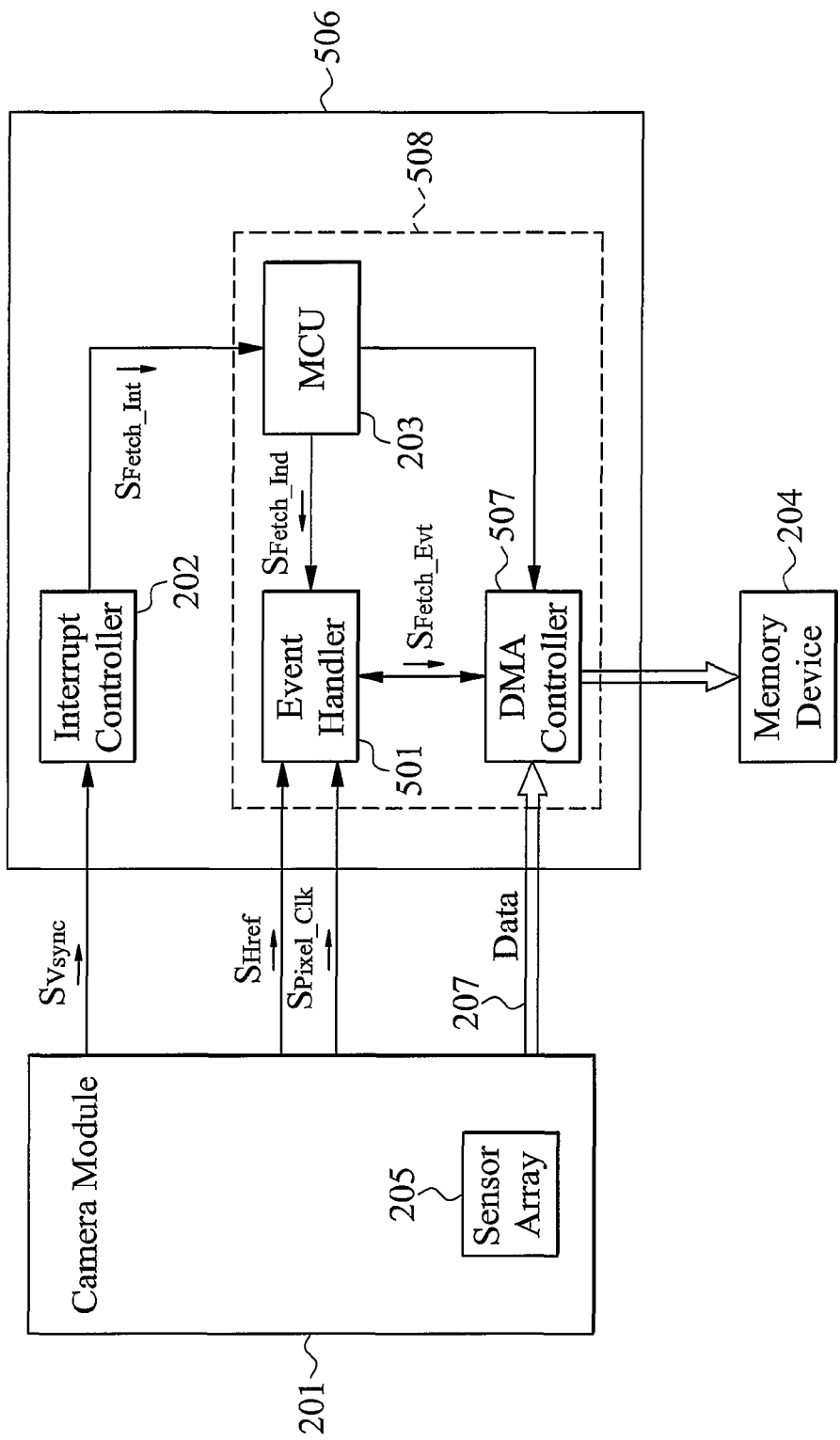
FIG. 11 shows a block diagram of an apparatus for capturing and storing a plurality of real-time images according to a fourth embodiment of the invention.

FIG. 11 shows a block diagram of an apparatus 500 for capturing and storing a plurality of real-time images according to a fourth embodiment of the invention. As shown in FIG. 11, the apparatus 500 comprises a camera module 201, a memory device 204 and a chip 506. The chip 506 comprises an interrupt controller 202, and a processing unit 508, wherein the processing unit 508 further comprises an MCU 203, an event handler 501, and a direct memory access (DMA) controller 507. The camera module 201 is not described herein for brevity, as reference may be made to the prior descriptions of FIG. 8. The interrupt controller 202 receives a vertical synchronization signal $S_{Vsync}$ indicating a transmission start of a frame from the camera module 201 and accordingly generates a fetching interrupt signal $S_{Fetch\_Int}$ accordingly. After receiving the fetching interrupt signal $S_{Fetch\_Int}$, the MCU 203 triggers the event handler 501 to start to control the DMA controller 507 via a fetching indication signal $S_{Fetch\_Ind}$. The event handler 501 receives the horizontal synchronization signal $S_{Href}$ and the pixel clock $S_{Pixel\_Clk}$ from the camera module 201, and, when the horizontal synchronization signal $S_{Href}$ is at an active-high, repeatedly issues data fetching event $S_{Fetch\_Evt}$ (e.g. acknowledge signals) at rising or falling edges of pixel clock $S_{Pixel\_Clk}$ to the DMA controller 507. The event handler 501 informs the DMA controller 507 of a quantity of frame pixels via the data fetching event $S_{Fetch\_Evt}$. Once receiving a data fetching event $S_{Fetch\_Evt}$, the DMA controller 507 fetches pixel data on the data bus 207 via the I/O pads and stores the fetched pixel data in the memory device 204.

Figure 12:
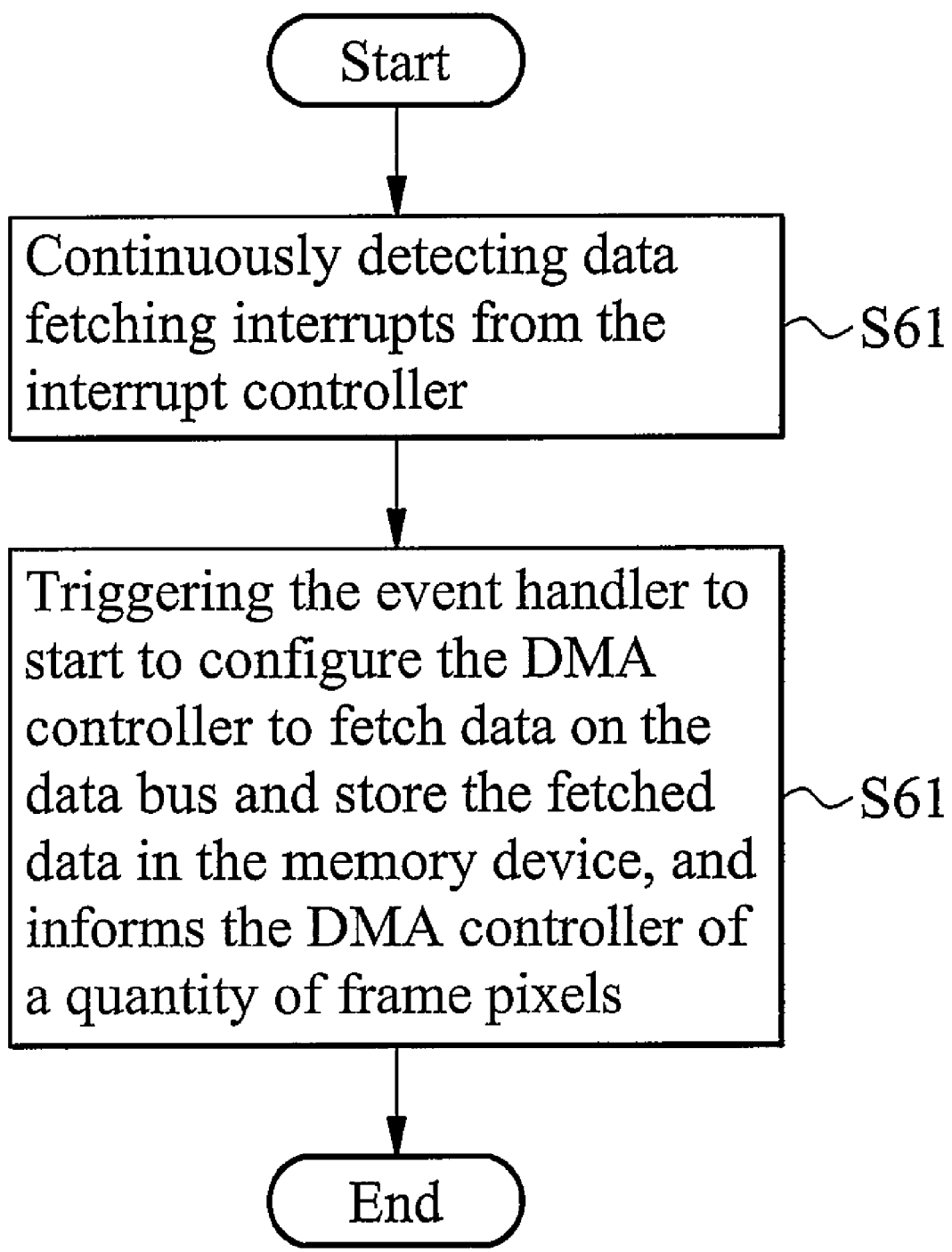
FIG. 12 shows a flowchart of the method performed by the MCU for capturing and storing real-time images according to the fourth embodiment of the invention.

FIG. 12 shows a flowchart of the method performed by the MCU 203 for capturing and storing real-time images according to the fourth embodiment of the invention. The MCU 203 continuously detects data fetching interrupts from the interrupt controller 202 (Step S61). Upon receiving a data fetching interrupt from the interrupt controller 202, the MCU 203 triggers the event handler 501 to start to control the DMA controller 507, in addition, configures the DMA controller 507 to fetch data on the data bus 207 and store the fetched data in the memory device 204, and informs the DMA controller 507 of a quantity of frame pixels (Step S62). Note that steps S61 and S62 may be performed when the MCU 203 executes a interrupt handler corresponding to the data fetching interrupt signal or a software function, module or routine, or the like called by the corresponding interrupt handler.

Figure 13:
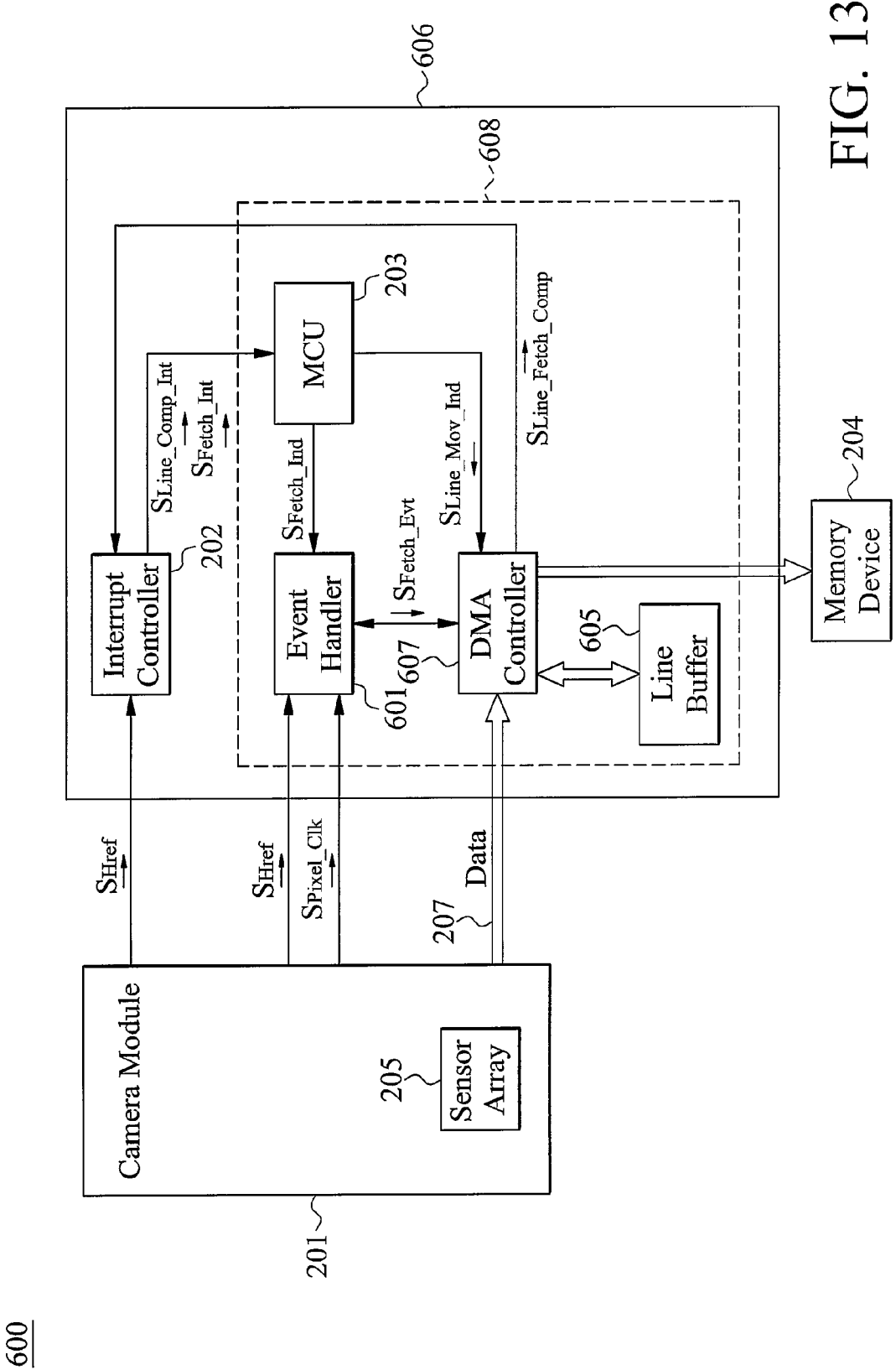
FIG. 13 shows a block diagram of an apparatus for capturing and storing a plurality of real-time images according to a fifth embodiment of the invention.

FIG. 13 shows a block diagram of an apparatus 600 for capturing and storing a plurality of real-time images according to a fifth embodiment of the invention. As shown in FIG. 13, the apparatus 600 comprises a camera module 201, a memory device 204 and a chip 606. The chip 606 comprises an interrupt controller 202, and a processing unit 608, wherein the processing unit 608 further comprises an MCU 203, an event handler 601, a line buffer 605 and a direct memory access (DMA) controller 607. The camera module 201 is not described herein for brevity, as reference may be made to the prior descriptions of FIG. 8. The interrupt controller 202 receives a horizontal synchronization signal $S_{Href}$ indicating that signals being carried on the data bus 207 are actual pixel data of a frame line from the camera module 201 and accordingly generates a fetching interrupt signal $S_{Fetch\_Int}$ accordingly. After receiving the fetching interrupt signal $S_{Fetch\_Int}$, the MCU 203 determines whether the frame line to be fetched is a dummy line. If not, the MCU 203 triggers the event handler 601 to start to control the DMA controller 607 via a fetching indication signal $S_{Fetch\_Ind}$. The event handler 601 receives the horizontal synchronization signal $S_{Href}$ and the pixel clock $S_{Pixel\_Clk}$ from the camera module 201, and, when the horizontal synchronization signal $S_{Href}$ is at an active-high, repeatedly issues data fetching event $S_{Fetch\_Evt}$ (e.g. acknowledge signals) at rising or falling edges of pixel clock $S_{Pixel\_Clk}$ to the DMA controller 607. The event handler 601 informs the DMA controller 607 of a quantity of frame pixels. Once receiving a data fetching event $S_{Fetch\_Evt}$, the DMA controller 607 fetches pixel data on the data bus 207 via the I/O pads and stores the fetched pixel data in the line buffer 605. After fetching and storing the quantity of pixels of a frame line, the DMA controller 607 outputs a line fetching completion signal $S_{Line\_Fetch\_Comp}$ to the interrupt controller 202. The interrupt controller 202 further generates a line fetching completion interrupt signal $S_{Line\_Comp\_Int}$ to the MCU 203 after receiving the line fetching completion signal $S_{Line\_Fetch\_Comp}$. The MCU 203 further generates a line data moving indication signal $S_{Line\_Mov\_Ind}$ after receiving the line fetching completion interrupt signal $S_{Line\_Fetch\_Comp}$ and waits for another fetching interrupt $S_{Fetch\_Int}$ from the interrupt controller 202. The DMA controller 607 subsequently moves the pixel data from the line buffer 605 to the memory device 204 after receiving the line data moving indication signal $S_{Line\_Mov\_Ind}$. Note that for those skilled in the art, subsequent processes following detection of a subsequent fetching interrupt signal from the interrupt controller 202 may be deduced based upon the previous descriptions.

Figure 14:
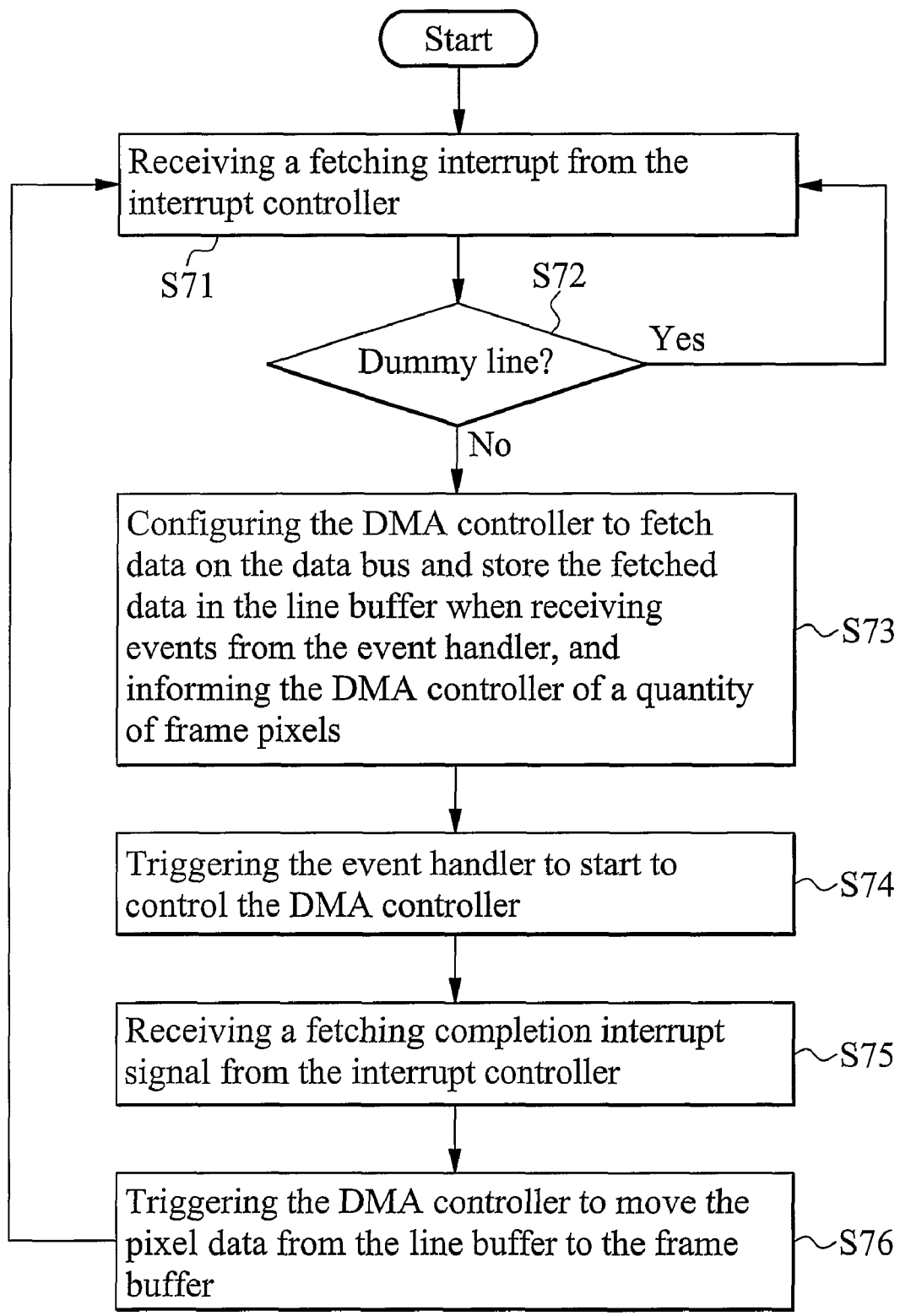
FIG. 14 shows a flowchart of the method performed by the MCU for capturing and storing real-time images according to the fifth embodiment of the invention.

FIG. 14 shows a flowchart of the method performed by the MCU 203 for capturing and storing real-time images according to the fifth embodiment of the invention. The 203 continuously detects fetching interrupts from the interrupt controller. Upon receiving a fetching interrupt from the interrupt controller 202 (Step S71), the MCU 203 determines whether a frame line to be fetched is a dummy line (Step S72). If not, the MCU 203 configures the DMA controller 607 to fetch data on the data bus 207 and store the fetched data in the line buffer 605 when receiving events from the event handler 601, and informs the DMA controller 607 of a quantity of frame pixels (Step S73). Next, the MCU 203 triggers the event handler 601 to start to control the DMA controller 607 (Step S74). After receiving a fetching completion interrupt signal from the interrupt controller 202 (Step S75), the MCU 203 triggers the DMA controller 607 to move the pixel data from the line buffer 605 to the memory device 204 (Step S76) and waits for another fetching interrupt signal from the interrupt controller 202 (Step S71). Note that the loop containing steps S71 to S76 may be performed when the MCU 203 executes a interrupt handler corresponding to the fetching interrupt signal or a software function, module, routine or the like called by the corresponding interrupt handler.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An apparatus for capturing and storing a plurality of real-time images, accompanying with a camera module recording a plurality of frames corresponding to sensed light via a sensor array, outputting pixel data of the frames on a data bus, and generating a plurality of synchronization control signals to control the synchronized transmission of the frames, the apparatus comprising:

an interrupt controller receiving the synchronization control signals and correspondingly generating a plurality of interrupt signals; and a processing unit executing an interrupt service routine when receiving the interrupt signals to fetch the pixel data of the frames on the data bus according to at least one of the interrupt signals, and store the fetched pixel data in a memory device, wherein the processing unit further comprises:

a micro control unit (MCU) generating a fetching indication signal according to a fetching interrupt signal, wherein the fetching interrupt signal is generated by the interrupt controller according to a horizontal synchronization signal indicating that signals being carried on the data bus is actual pixel data of a frame line;

a line buffer;

an event handler coupling to the MCU, receiving the horizontal synchronization signal and a pixel clock synchronizing each pixel data transmission, and generating a data fetching event according to the horizontal synchronization signal and the pixel clock after receiving the fetching indication signal; and a dynamic memory access (DMA) controller coupling to the memory device, the event handler and the line buffer, moving the pixel data on the data bus to the line buffer according to the data fetching event and moving the pixel data from the line buffer to the memory device after receiving a line data moving indication signal.

2. The apparatus as claimed in claim 1, wherein the MCU further determines whether the pixel data of the frame line is dummy data after receiving the fetching interrupt signal and generates the fetching indication signal when determining that the pixel data of the frame line is not dummy data.

3. The apparatus as claimed in claim 1, wherein the DMA controller further outputs a line fetching completion signal to the interrupt controller when the DMA controller completes moving of the pixel data of one of the frame lines, and wherein the interrupt controller further generates a line fetching completion interrupt signal to the MCU after receiving the line fetching completion signal, and wherein the MCU further generates the line data moving indication signal after receiving the line fetching completion interrupt signal.

4. An apparatus for capturing and storing a plurality of real-time images, comprising:

a camera module recording a plurality of frames corresponding to sensed light via a sensor array, outputting pixel data of the frames on a data bus, and generating a plurality of synchronization control signals to control the synchronized transmission of the frames;

an interrupt controller receiving the synchronization control signals and generating a plurality of interrupt signals, wherein the interrupt signals comprise a fetching interrupt signal generated according to at least one of the synchronization control signals to trigger an interrupt handler corresponding thereto;

a micro control unit (MCU) generating a fetching indication signal when executing the interrupt handler;

an event handler receiving a horizontal synchronization signal indicating that signals being carried on the data bus is actual pixel data of a frame line and a pixel clock synchronizing each pixel data transmission, and generating a data fetching event according to the horizontal synchronization signal and the pixel clock after receiving the fetching indication signal; and a dynamic memory access (DMA) controller moving the pixel data on the data bus to a memory device according to the data fetching event.

5. The apparatus as claimed in claim 4, wherein the fetching interrupt signal is generated according to a vertical synchronization signal indicating the beginning of pixel data transmission of each frame.

6. The apparatus as claimed in claim 4, wherein the event handler generates the data fetching event repeatedly on the rising or falling edges of the pixel clock when the horizontal synchronization signal is at an active-high.

7. The apparatus as claimed in claim 4, further comprising:
a line buffer storing the pixel data of one of the frame lines;
wherein the fetching interrupt signal is generated according to the horizontal synchronization signal, and wherein the DMA controller moves the pixel data on the data bus to the line buffer according to the data fetching event and moves the pixel data from the line buffer to the memory device after receiving a line data moving indication signal.

8. The apparatus as claimed in claim 7, wherein the MCU further determines whether the pixel data of the frame line is dummy data after receiving the fetching interrupt signal and generates the fetching indication signal when determining that the pixel data of the frame line is not dummy data.

9. The apparatus as claimed in claim 7, wherein the DMA controller further outputs a line fetching completion signal to the interrupt controller when the DMA controller completes moving of the pixel data of one of the frame lines, and wherein the interrupt controller further generates a line fetching completion interrupt signal to the MCU to trigger an interrupt handler corresponding to the line fetching completion signal after receiving the line fetching completion signal, and wherein the MCU further generates the line data moving indication signal when executing the interrupt handler corresponding to the line fetching completion interrupt signal.

* * * * *